US006704181B2

(12) United States Patent
Saksa

(10) Patent No.: US 6,704,181 B2
(45) Date of Patent: Mar. 9, 2004

(54) ADAPTIVE POWER CIRCUIT PROTECTION APPARATUS AND METHOD

(75) Inventor: Thomas A. Saksa, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 472 days.

(21) Appl. No.: 09/772,251

(22) Filed: Jan. 26, 2001

(65) Prior Publication Data

US 2002/0101695 A1 Aug. 1, 2002

(51) Int. Cl.$^7$ ................................................. H04B 3/36

(52) U.S. Cl. ...................... 361/64; 361/93.1; 340/425.2; 340/310.08

(58) Field of Search ...................... 361/93.1, 97, 93.2, 361/42, 54, 62, 63, 64, 83, 91.3, 89; 340/425.2, 310.08, 7.73, 7.36, 3.1, 3.8, 656, 657, 534, 538, 653, 654, 505, 520, 870.39, 870.27; 700/22–24, 286, 292, 293, 295; 307/29, 38, 40, 125, 131, 132 E, 132 M

(56) References Cited

U.S. PATENT DOCUMENTS

| 4,644,320 | A | * | 2/1987 | Carr et al. ............. 340/310.06 |
| 5,051,720 | A |   | 9/1991 | Kittirutsunetorn ...... 340/310 R |
| 5,101,191 | A | * | 3/1992 | MacFadyen et al. ... 340/310.01 |
| 5,373,411 | A |   | 12/1994 | Grass et al. .................. 361/64 |
| 5,554,968 | A |   | 9/1996 | Lee ........................ 340/310.01 |
| 5,638,296 | A |   | 6/1997 | Johnson et al. ............. 364/492 |
| 5,875,087 | A | * | 2/1999 | Spencer et al. ................ 361/87 |
| 6,084,758 | A |   | 7/2000 | Clarey et al. ................. 361/62 |
| 6,157,527 | A |   | 12/2000 | Spencer et al. ............... 361/64 |
| 6,356,426 | B1 | * | 3/2002 | Dougherty .................. 361/102 |
| 6,477,021 | B1 | * | 11/2002 | Haun et al. .................... 361/42 |

* cited by examiner

Primary Examiner—Ronald W. Leja
(74) Attorney, Agent, or Firm—Larry Baker

(57) ABSTRACT

Disclosed is a "smart" power circuit protection system in which the trip level of a circuit breaker is dynamically set based upon information communicated from the load over the power lines. The system is adaptable to configurations involving multiple loads protected by a single circuit breaker, and an adapter permits loads not incorporating a "smart" current reporting capability to be included in the circuit breaker load. The invention is intended to provide additional protection against line to neutral power faults.

7 Claims, 4 Drawing Sheets

ADAPTIVE POWER CIRCUIT PROTECTION APPARATUS AND METHOD

TECHNICAL FIELD OF THE INVENTION

The present invention relates generally to electrical switching devices and methods, and more specifically to a circuit breaker apparatus which dynamically sets its current trip level based on information communicated from the load.

BACKGROUND OF THE INVENTION

Many situations exist in which power circuit faults may be dangerous or even catastrophic, ranging from the risk of electrical burns or electrocution in the home, to the triggering of fires or explosions in industrial settings. Aircraft, including a commercial airliner, have been lost as a result of frayed insulation on wires running through fuel tanks; spacecraft have been severely damaged by wiring faults, and explosions in mines and factories have been caused by electrical short circuits.

Existing circuit protection devices, such as fuses, circuit breakers, and ground fault interruptors (GFI) are important safety components, but are limited in the types of electrical faults they protect against.

Circuit breakers and fuses are typically "sized" to limit the current in a circuit to the maximum current that may be safely carried by the power distribution circuit wiring. Thus, a circuit breaker may be sized at 20 to 100 Amperes based on the current carrying capacity of the power distribution wiring, even though the appliance or electrical machinery the circuit breaker feeds may require only a few amperes of operating current. A dangerous electrical fault may thus exist, drawing many amps of current, without tripping a circuit breaker or blowing a fuse.

Ground Fault Interruptor (GFI) protective circuits are also well known in art. GFI circuits interrupt the application of electric power to a load in response to an imbalance of a predetermined magnitude in the current flowing through the current-carrying wires connected between the source and the load. Typically, a ground fault interrupter circuit uses one or more differential transformers to monitor the current through the "hot" and "neutral" lines extending between a load and a source of power and generates a fault signal whenever the imbalance between the currents in the hot and neutral lines exceeds a predetermined value. When the two currents differ, indicating that some portion of the line (or "hot") current has found an alternative path to ground, the GFI trips and shuts off the circuit.

Initially installed in public and commercial settings where electrical equipment was used around water, GFI circuits are now used universally in new construction wherever a likelihood of electrical equipment coming into contact with water exists, such as in bathrooms and kitchens. GFI circuits afford an important degree of protection against electrocution hazards where an individual may inadvertently come into contact with a "hot" electrical source while another portion of the individual's body is grounded.

GFI circuits, however, do not adequately protect against situations involving "line" (or "hot") to neutral faults. In such faults, the currents in both the hot and neutral lines will increase equally with the fault current flowing along the hot line, through the fault, and returning along the neutral line. To a GFI circuit, the fault would appear as simply an increase in the electrical load current. If the fault current did not result in the total load current exceeding the trip level of the circuit breaker of the power distribution system, no protection against the fault would be provided.

There is thus a need for circuit protection devices and methods which provide an increased level of protection, particularly in situations where a relatively minor electrical fault may have catastrophic consequences.

SUMMARY OF THE INVENTION

It is an object of the present invention to provide a "smart" power circuit protection device which dynamically sets its trip level based upon information received from the load, or power consuming, device.

It is a further object of the invention to provide "smart" circuitry for power consuming devices, such that the power consuming devices may report their power requirements to the smart power circuit protection device.

It is a still further object of the invention to provide a smart power circuit protection device which dynamically sets its trip level based upon information received from a plurality of loads by summing the load requirements of the different loads.

It is a still further object of the invention to provide an adapter device allowing power consuming devices which lack a "smart" power requirement reporting capability to be used with the smart power circuit protection device.

The present invention also provides methods of setting a trip level in a power circuit protection device based upon information received from the electrical load; methods of reporting power usage requirements from an electrical load to a power protection device; and methods of using electrical devices lacking a power usage reporting capability with a smart power protection device.

DESCRIPTION OF THE PREFERRED EMBODIMENT

Overview of the Invention

Figure 1:
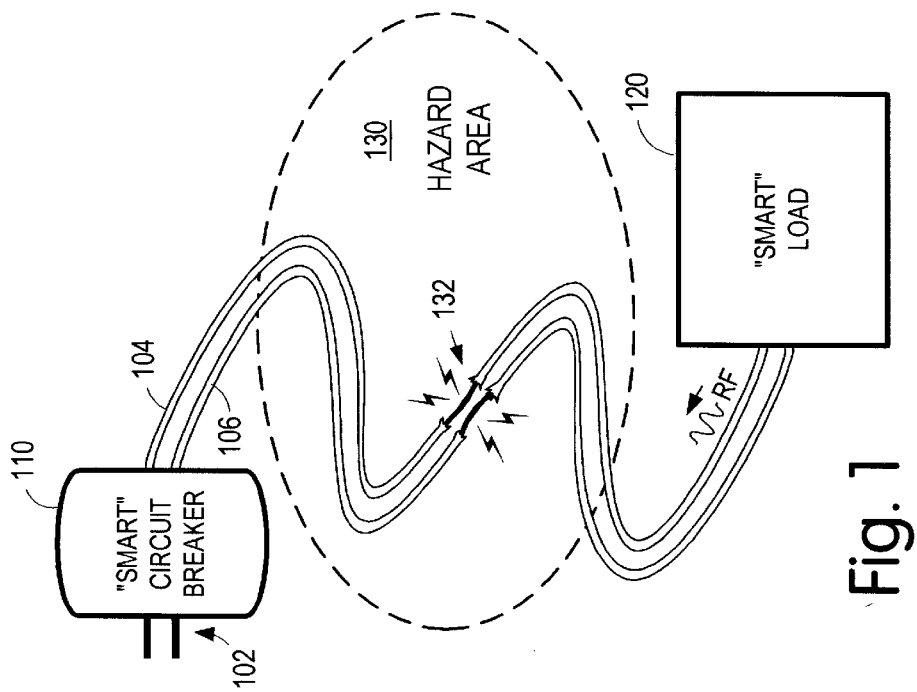
FIG. 1 is a conceptual block diagram illustrating the type of environment in which the smart circuit protection device of the present invention provides an increased level of safety.

FIG. 1 is a conceptual block diagram illustrating the type of environment in which the smart circuit protection device of the present invention may be most effectively applied to improve safety. Electrical power is received from the power mains 102 by the "smart" circuit breaker 110 and is selectively applied to the "hot" 104 and "neutral" 106 lines with an adaptive "trip" level, as discussed below. Although only two lines, "hot" and "neutral", are illustrated, the power distribution lines may include a ground line, or may be three-phase delta or wye.

To route electrical power from a distribution point at which the circuit protection device is located to a remote piece of electrical apparatus, as represented in FIG. 1 by "smart" load 120, it is often necessary that the power distribution wires 104 and 106 pass through an area 130 where there is some potential or real hazard. Such hazards may include explosive atmospheres, such as in a factory, mine, aircraft, or spacecraft, or a hazards to personnel who may come into contact with exposed wiring. In many situations power must be routed in a manner which makes it difficult to insure the that line to neutral faults do not develop, such as indicated at 132, or it may be difficult or impossible to routinely inspect the condition of the wiring. In many situations, such as explosive atmospheres, even a relatively small current flowing through a line to neutral fault could prove catastrophic. The present invention seeks to improve safety in such situations by having the "smart" load communicate its power requirements to the "smart" circuit protection device with RF signals communicated over the power lines.

DETAILED DESCRIPTION OF THE PREFERRED EMBODIMENT

Figure 2:
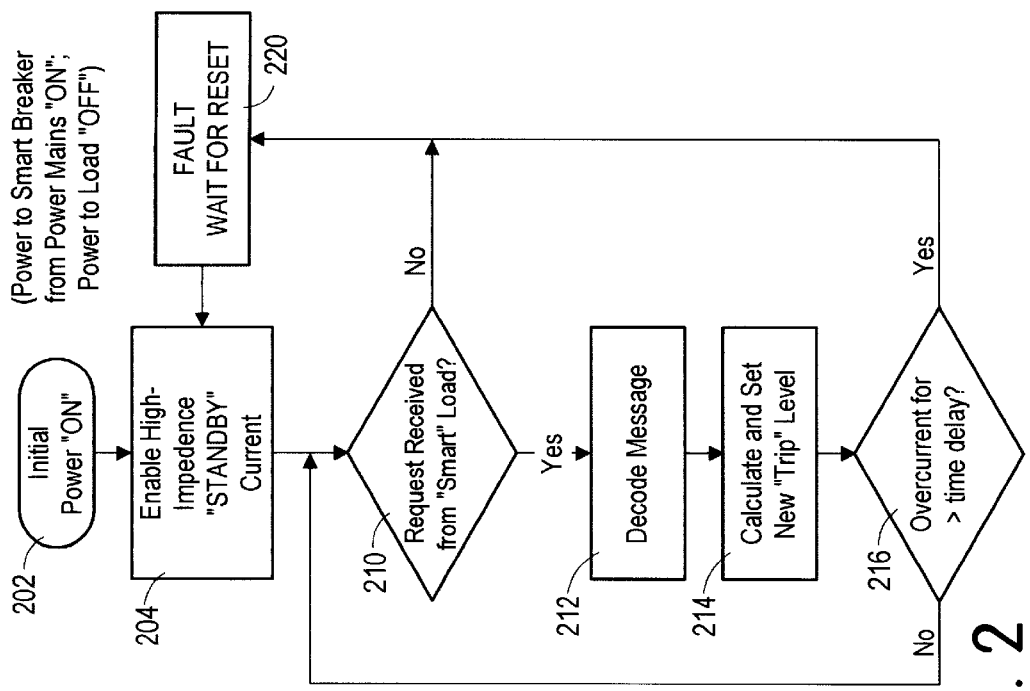
FIG. 2 is a flow diagram illustrating the basic logic utilized by the circuit protection device of the present invention to determine its trip level.

FIG. 2 is flow chart demonstrating the basic logic of the "smart" circuit breaker. When power is first applied 202 to the breaker from the power mains, the breaker enables 204 a relatively small "standby" current to the load through a relatively high impedance source; the current being sufficient only to power the logic devices in the load, and not sufficient to represent a hazard if a fault condition between line and load exists.

The circuit protection device waits for a request 210 from the "smart" load for power. The message is decoded 212 by the circuit protection device; the message from the smart load indicates the current level required by the load. The circuit protection device calculates and sets the new "trip" point for the breaker 214. As discussed below, the circuit breaker may power several smart loads, in which case the new "trip" point would be determined from the sum of the currents requested from the loads. The circuit breaker may include the ability to ignore short overcurrents due to in-rush currents when devices start up, as shown at 216; in the presently preferred embodiment, this ability would be implemented by checking that the overcurrent condition existed for more than a preset minimum time period. If an overcurrent does exist for more than a present minimum time period, the breaker trips, as shown at 220, and waits for a reset.

The preferred embodiment of the breaker continuously monitors for messages from the loads, and requires that a message be received from each load within a specified time interval, or the breaker trips (as discussed below). Thus, the preferred embodiment requires only "one way" communication from the loads to the breaker, and if for some reason a load stops generating requests (due to some interruption in the wiring or a failure of the load device) the breaker trips. The basic concept of the circuit breaker could also be implemented with two-way communications between the breaker and loads, in which the breaker periodically "polls" each of the loads for its current requirements.

Figure 3:
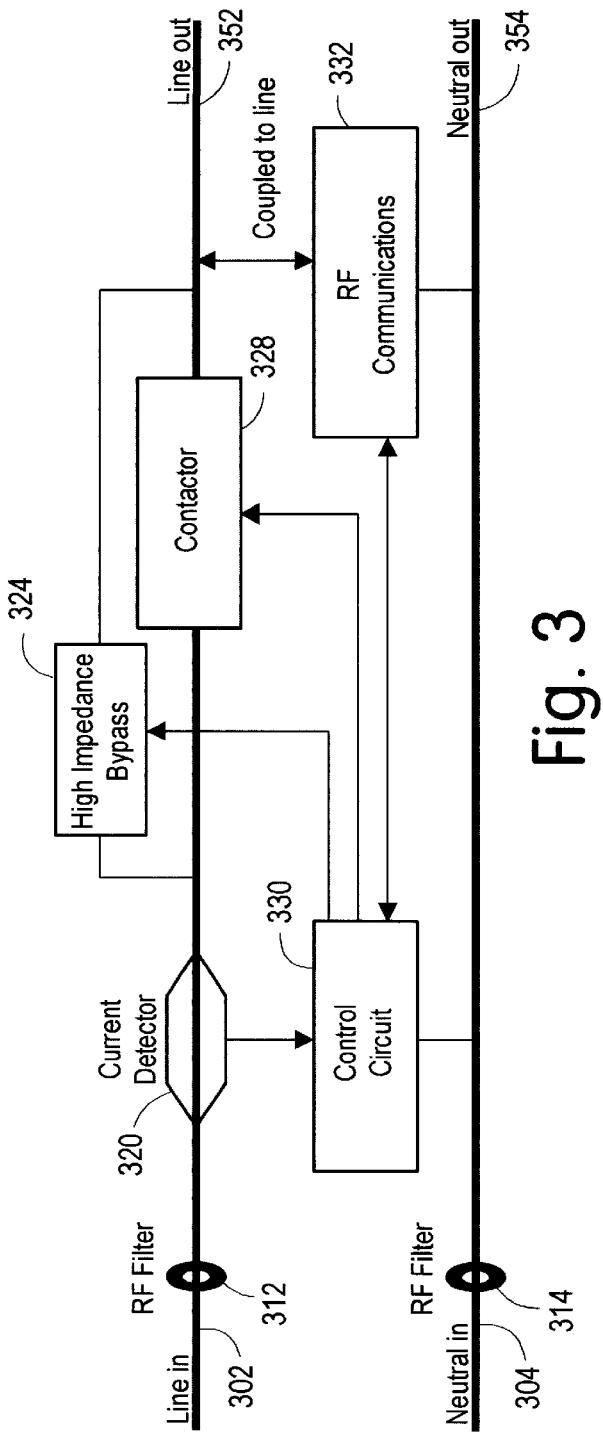
FIG. 3 is a schematic diagram indicating the major circuit components of the most basic form of smart circuit protection device of the present invention.

FIG. 3 is a schematic diagram of the smart circuit protection device of the present invention. AC power is received by the device on a Line In 302 and Neutral In 304. Although only two lines are shown, the concept of the device may easily be extended to three-phase delta and wye circuits. The preferred embodiment of the present invention includes RF filter 312 and 314 on the two AC power lines to prevent the RF messages from the load from being propagated back into the power distribution system and potentially causing problems with other similar protection devices in the system. The system could alternately include unique addresses for each load and protection device in the system, obviating the need for the filters, as discussed below.

The current on the Line In is sensed by a current detector 320 to detect overcurrent situations. Suitable current detectors include resistors, inductors, heating elements, magnetic devices, and other current sensors known in the art. The Line In current may be applied to the Line Out 352 of the device through either a high-impedance bypass device 324 or a power contactor 328. The high impedance bypass may comprise either a semiconductor device or a mechanical contactor with a current-limiting element in the line, or any other device which may be used to provide a limited current source. The contactor may comprise any of the electronic or electro-mechanical devices commonly used to control electrical power lines.

Control circuit 330 typically comprises a semiconductor programmable controller or microprocessor. To reduce production costs a custom integrated circuit may be used. The decision-making logic required within the protection circuit is sufficiently simple that the control circuit may also conceivably be implement with simple electronic circuit elements or electromechanical devices. The control circuit 330 receives measurement inputs from the current detector 320 and decoded messages from the RF Communications Circuit 332, which is coupled to the Line Out 352 to receive messages from the smart load.

Devices which transmit and receive RF signals over power lines are well known in the art. Very common are devices using the X-10™ system, which allows remote control of lights and appliances, and which are available from many different vendors. Additional examples of master power-control units and their slaves may be found for example in U.S. Pat. No. 4,677,566 "Power Control Network For Multiple Digital Modules", issued Jun. 30, 1987 to Whittaker et al.; U.S. Pat. No. 4,643,062 "Power Control Network Using Reliable Protocol", issued Jan. 6, 1987 to Jeppesen et al.; and U.S. Pat. No. 4,864,589 "Spread Spectrum Power Line Communication", issued Sep. 5, 1989 to Endo. The present invention contemplates use of a similar protocol to the X10 system, although messages may be greatly simplified by the need to communicate only between a single load and a single smart circuit protection device. Alternatively, a full protocol similar to the X-10™ system may be implemented, allowing additional features to be easily incorporated into the protection device, such as reporting fault conditions to a remote controller, or providing unique addresses to each smart load for diagnostic and testing purposes.

Figure 4:
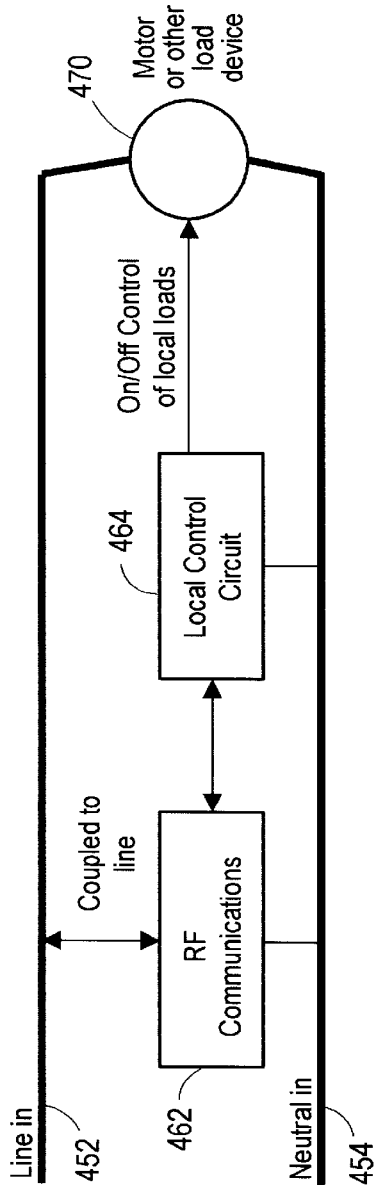
FIG. 4 is a schematic diagram indicating the major circuit components of a smart load device.

FIG. 4 is a schematic diagram of a smart load device of the present invention. Although two power lines, Line In 452 and Neutral 454 are shown; the concept of the present invention may easily be extended to other configurations, such as three-phase power. RF Communications Circuit 462 is coupled to the power lines and generates current request messages to the smart circuit protection device. The Communications Circuit may most basically be a transmit-only circuit; alternatively, a more complex circuit and communications protocol may be implemented, allowing the exchange of additional information between the load and the protection device.

The RF Communications Circuit receives the required current request information from the Local Control Circuit 464. In most devices in which the smart load concept of the present invention is likely to be incorporated, the Local Control Circuit already exists in the form of a microcontroller or microprocessor, and only the added function of sending current requests to the need smart protection device need be added. In the most basic form of one-way communication from the smart load to the protection device, a "smart" load would need no modification to function with a standard, or "dumb", power distribution system. The Local Control Circuit 464 also performs the normal functions of providing on/off and other control to the loads 470 within the smart load.

Figure 5:
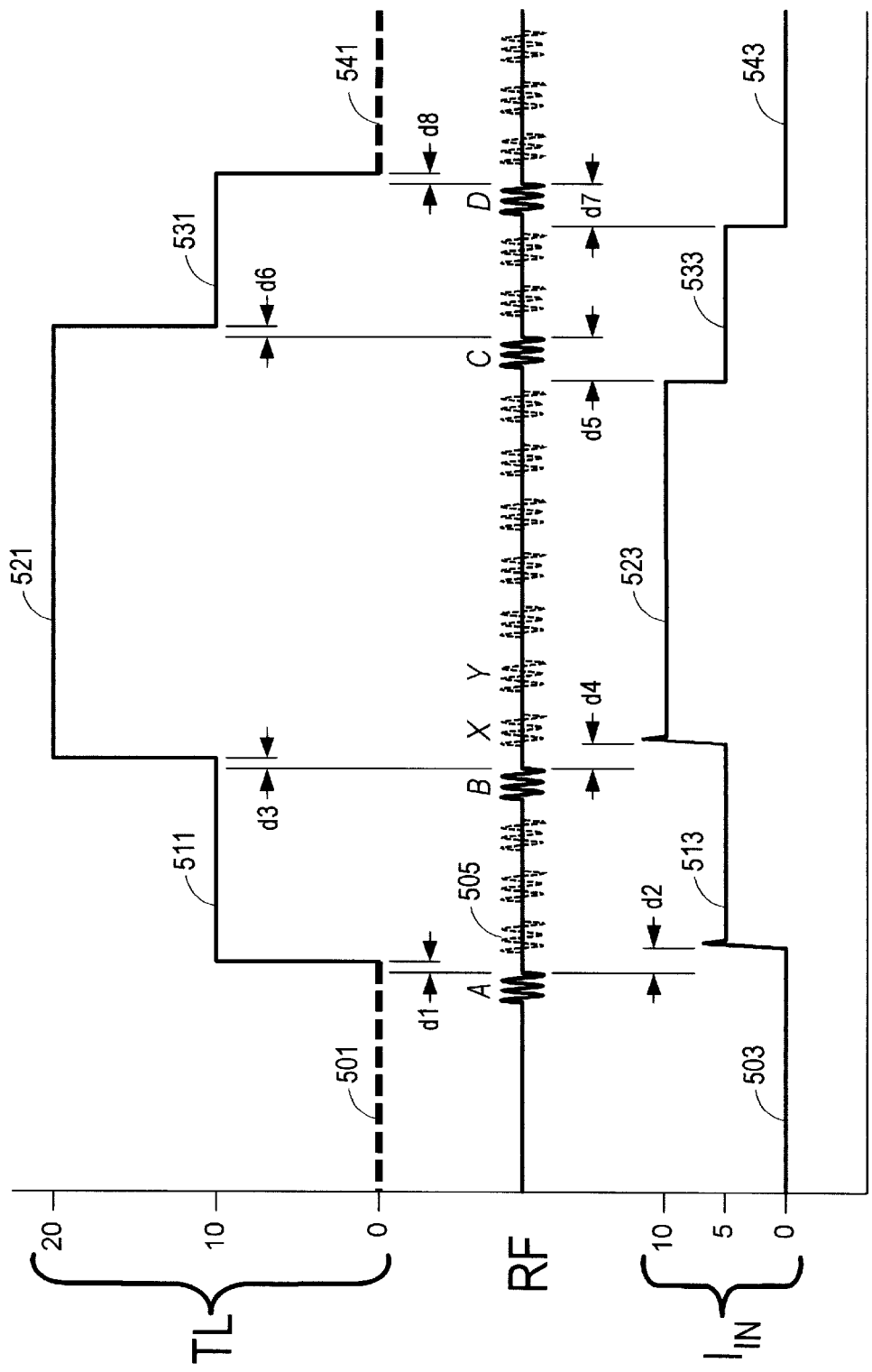
FIG. 5 is an illustrative timing diagram indicating how communication between the smart load and the most basic form of smart circuit protection device results in the trip level of the circuit protection device being set.

FIG. 5 is a sample timing diagram illustrating how a smart protection device and smart load may work in practice. The smart circuit breaker trip level "TL" is represented by the top curve; the RF communications from the smart load is represented by the middle curve, and the current use by the load is indicated by the bottom curve.

At power on, the circuit protection device allows a low level current to be applied to the load through the high impedance bypass, as indicated by the dashed line at 501. The current being drawn by the load is only that being used by the Local Control and RF Communications circuits, and is consequently very low, as indicated at 503. When the load needs an increase in current, it sends request "A" to the protection device. In the example illustrated, the load requires 5 Amps. The protection device decodes the request and, after delay "d1", sets the trip level appropriately (in the case illustrated, to 10 Amps, allowing a safe operating margin). The load allows for a longer delay, "d2", before actually turning on the current-drawing device. The appropriate delay times, d1 and d2, are most simply be built in to the smart load and smart circuit protection device (the preferred implementation); the delay time requirement could be transmitted as part of the message from the load to the protection device; or the delay could be "negotiated" through a more complex "handshake" between the load and the protection device.

A second requested current increase is illustrated at "B", and the corresponding new trip level at 521 and load current at 523. When the smart load reduces its current needs, as at "C" and "D", the timing requirements are somewhat different, as the current decrease must take place prior to the decrease in the trip level, as shown by delays d5 and d7 preceding messages "C" and "D".

In the preferred embodiment, the load continuously generates requests at a relatively fixed time interval as indicated by the dashed lines 505. If the breaker does not receive a request from the load for more than a preset period of time (for example, if messages X and Y in FIG. 5 were missing from the data stream) the breaker declares a "fault" and trips.

An advantage of the present invention over traditional circuit breakers and fuses is that when the smart load is not drawing current, the circuit can be de-energized in a "standby" condition, with only enough current being supplied to the load to power the Local Control and RF Communications Circuits in the load. The small current that is flowing through the power lines is supplied through the high impedance bypass of the protection circuit, so that if a fault does occur between the "hot" and "neutral" lines, only a very small current would flow (and if the protection device includes the capability to monitor the standby current, even this low-level current would be cut off). In many applications, current is needed by a load device only sporadically, automatically de-activation of the power circuit when power is not needed adds a substantial measure of increased safety.

Figure 6:
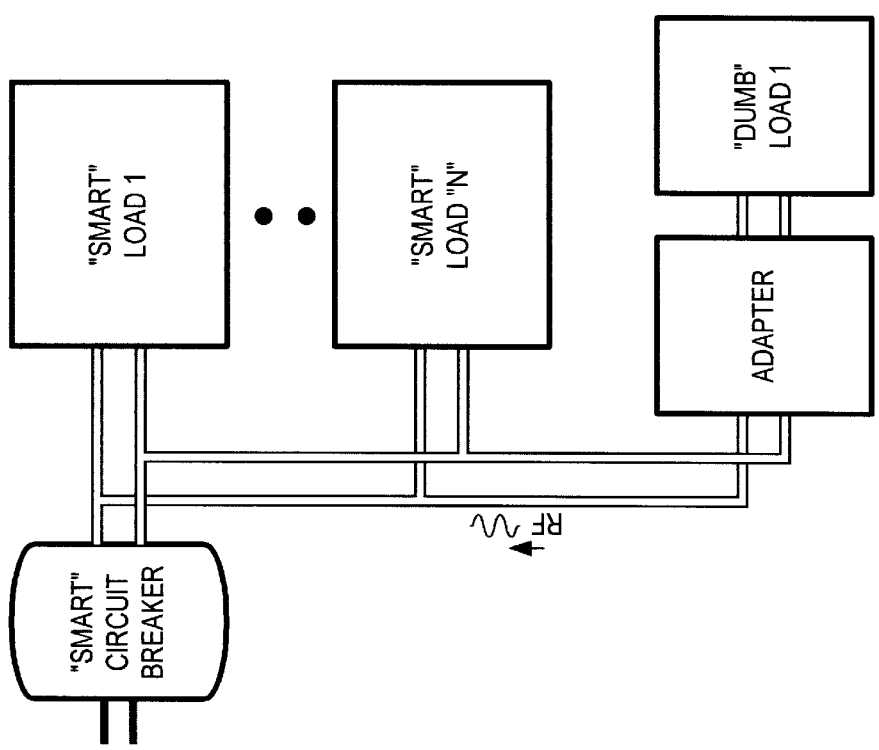
FIG. 6 is an illustrative block diagram showing how a plurality of loads, both smart loads and "dumb" loads, may be powered by a single "smart" circuit protection device.

FIG. 6 is a block diagram illustrating a plurality of loads connected to a single protection circuit, including "N" smart loads and a "dumb" load. To accommodate multiple smart loads, the smart circuit breaker requires the additional ability to sum the current requests when setting the trip level. A protocol in which the smart circuit breaker polls the various loads for the current needs, similar to the communications in an X-10™ system, would avoid "collisions" of request messages.

Figure 7:
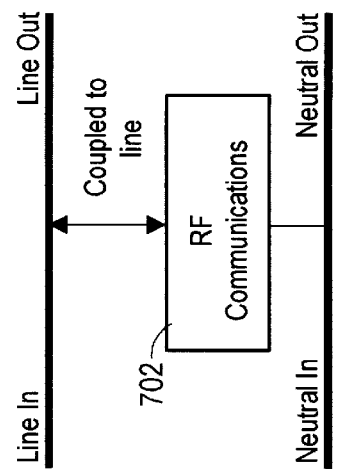
FIG. 7 is a block diagram of an adapter device allowing "dumb" loads to be used in a power circuit having a "smart" circuit protection device.

Also shown in FIG. 6 is a "dumb" load connected to the smart circuit breaker through an adapter. The adapter, as shown in FIG. 7, consists of a simple device which issues a fixed current request to the smart protection circuit. By way of illustration, a home owner may plug a lamp into a wall outlet controlled by a smart circuit breaker using an adapter set for a fixed current level such as 2 Amperes; the smart circuit breaker would thereafter add 2 Amperes to the total current requested by other devices, regardless of whether the lamp was turned "ON" or "OFF". The adapter may be physically similar to the adapters used to connect three-prong (line, neutral, and ground) power cords to older two-prong (line and neutral) power outlets. Although some of the advantages of the protection circuit would be lost (such as having the circuit return to a "standby" power condition when the load does not require power), such an adapter allows for a graceful transition to an "all smart" power system. The adapter may alternatively include the ability to measure the actual current being drawn by the fixed load, and to adjust its current requests to the circuit breaker accordingly.

The preferred embodiment of the power protection circuit of the present invention would physically resemble a convention circuit breaker, and would be capable of being installed in equipment designed for convention circuit breakers (in homes and commercial buildings, for example, the preferred embodiment could be installed in common circuit breaker panels such as those produced by the Square D and Westinghouse companies).

Although described with respect to hazardous conditions in an industrial setting, the concepts of the present invention may also be applied to more familiar everyday uses. Just as improvements in technology allowed ground fault interrupter (GFI) circuits to make their way into home bathrooms and kitchens, the increasing sophistication of home appliances will make the concept of the present invention increasingly attractive in domestic applications. For example, washing machines, dishwashers, ovens, furnaces, microwave ovens, and other household appliances are increasing likely to already incorporate some level of intelligent control, with a microprocessor controlling opening and closing valves and switching motors on and off. It is likely that other household appliances, both large and small, will eventually incorporate a fairly sophisticated level of intelligence. For example, "smart" refrigerators, irons, toasters, and even garbage disposals and lamps are probably not too far in the future. It's also likely that electrical systems in automobiles will similarly advance.

In many appliances, the ability to communicate over the power lines may already exist, such as with the X10™ devices discussed above. In others, adding the ability will add very little to the complexity or cost of the appliance. The added protection against electrical faults afforded by the present invention thus becomes increasingly attractive in the home.

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

The corresponding structures, materials, acts, and equivalents of all means or step plus function elements in the claims below are intended to include any structure, material, or acts for performing the functions in combination with other claimed elements as specifically claimed.

What is claimed is:

1. An adaptive power circuit protection system, comprising:
    a) a power circuit breaker having a settable current trip level and having internal logic to receive messages transmitted over the power line from the load protected by the breaker, and to set the breaker current trip level based on the message contents;
    b) control logic in the load protected by the breaker to determine the operating current required by the load, and to transmit over the power line to the circuit breaker a message whose contents indicate the load requirements;
    and wherein the control logic in the load further transmits messages to the circuit breaker at a continuous rate, and the internal logic of the circuit breaker causes the breaker to trip if a message is not received from the load for greater than a pre-established time interval.

2. An adaptive power circuit protection device comprising a power circuit breaker having a settable current trip level and having internal logic to receive messages transmitted over the power line from the load protected by the breaker, and to set the breaker current trip level based on the message contents, the internal logic further comprising logic causing the breaker to trip if a message is not received from the load for greater than a pre-established time interval.

3. An adaptive power circuit protection system comprising:
    a) a circuit breaker having
        1) a power main input and an interruptible power line output, the interruptible power line output having a settable current trip point,
        2) radio frequency receiving circuitry electrically coupled to the power line output, and
        3) control circuitry for receiving and decoding messages received through the radio frequency receiving circuitry and setting the current trip point based upon the message contents;
    b) a power load device having
        1) a power line input in electrical communication with the circuit breaker power line output,
        2) radio frequency transmitting circuitry electrically coupled to the power line input, and
        3) circuitry for determining the load power measurements, generating messages representing the requirements, and communicating the messages through the transmitting circuitry to the circuit breaker, and wherein the power load device further transmits messages to the circuit breaker at a continuous rate, and the control circuitry of the circuit breaker causes the breaker to trip if a message is not received from the load for greater than a pre-established time interval.

4. An adaptive power circuit protection system, comprising:
    a) a power circuit breaker having a settable current trip level and having internal logic to receive messages transmitted over the power line from multiple loads protected by the breaker, to determine the total current requirements of the multiple loads based on the message contents, and to set the trip level accordingly; and
    b) control logic in each of the multiple loads protected by the breaker to determine the operating current required by the load, and to transmit over the power line to the circuit breaker a message whose contents indicate the load requirements, and
        wherein the control logic in each or the loads further transmits messages to the circuit breaker at a continuous rate, and the internal logic of the circuit breaker causes the breaker to trip it a message is not received from each of the loads for greater than a pre-established time interval.

5. An adaptive power circuit protection device comprising a power circuit breaker having a settable current trip level and having internal logic to receive messages transmitted over the power line from multiple loads protected by the breaker, to determine the total current requirements of the loads based upon the message contents, and to set the breaker current trip level accordingly;
    the internal logic further comprising logic causing the breaker to trip if a message is not received from each of the loads for greater that a pre-established time interval.

6. An adaptive power circuit protection system, comprising:
    a) a circuit breaker having
        1) a power main input and en interruptible power line output, the interruptible power line output having a settable current trip point,
        2) radio frequency receiving circuitry electrically coupled to the power line output, and
        3) control circuitry for receiving and decoding messages from multiple sources received through the radio frequency receiving circuitry and setting the current trip point based upon the message contents;
    b) multiple power load devices, each load device having
        1) a power line input in electrical communication with the circuit breaker power line output,
        2) radio frequency transmitting circuitry electrically coupled to the power line input, and
        3) circuitry for determining the load power requirements, generating messages representing the requirements, and communicating the messages through the transmitting circuitry to the circuit breaker:
    and wherein each of the power load devices further transmits messages to the circuit breaker at a continuous rate, and the control circuitry of the circuit breaker causes the breaker to trip it a message is not received from each of the loads for greater than a pre-established time interval.

7. A method of protecting power circuits powering a load device and having a power line with hot and neutral lines, the hot line interruptible by a circuit breaker having a current trip level, from faults between the hot and neutral, comprising the steps of:

a) in the load device,
   1) determining the operating power current required by the load,
   2) generating and encoding a message representing the operating power required, and
   3) transmitting the encoded message on the power line; and b) in the circuit breaker,
   1) receiving the encoded message from the power line:
   2) decoding the message and determining an appropriate current trip level, and
   3) setting the circuit breaker current trio level to the appropriate current level;

and wherein the load device further generates and transmits messages at a continuous rate, and the circuit breaker further determines the time interval between successive received messages and causes the hot power line to be interrupted if the time interval exceeds a given value.

* * * * *

UNITED STATES PATENT AND TRADEMARK OFFICE
CERTIFICATE OF CORRECTION

PATENT NO. : 6,704,181 B2 Page 1 of 1
DATED : March 9, 2004
INVENTOR(S) : Thomas A. Saksa It is certified that error appears in the above-identified patent and that said Letters Patent is hereby corrected as shown below:

<u>Column 8,</u>
Line 26, delete "it" and insert in lieu thereof -- if --;
Line 45, delete "en" and insert in lieu thereof -- an --;

<u>Column 9,</u>
Line 1, delete "it" and insert in lieu thereof -- if --;

<u>Column 10,</u>
Line 5, delete "trio" and insert in lieu thereof -- trip --.

Signed and Sealed this

Tenth Day of August, 2004

JON W. DUDAS
*Acting Director of the United States Patent and Trademark Office*